United States Patent  
Yamazaki et al.

(10) Patent No.: US 7,605,214 B2
(45) Date of Patent: Oct. 20, 2009

(54) PROCESS FOR STOPPING CONTINUOUS POLYMERIZATION

(75) Inventors: Kazuhiro Yamazaki, Saijo (JP); Akira Nishitani, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 531 days.

(21) Appl. No.: 11/267,409

(22) Filed: Nov. 7, 2005

(65) Prior Publication Data
US 2006/0100400 A1    May 11, 2006

(30) Foreign Application Priority Data
Nov. 9, 2004    (JP) .............................. 2004-325506

(51) Int. Cl.
C08F 2/00    (2006.01)
C08F 2/02    (2006.01)
C08F 120/14    (2006.01)
(52) U.S. Cl. ......................... 526/73; 526/88; 526/329.7
(58) Field of Classification Search .................. 526/73, 526/88, 329.7
See application file for complete search history.

(56) References Cited

U.S. PATENT DOCUMENTS 3,957,744 A * 5/1976 Deuschel et al. .............. 526/73

4,433,122 A   2/1984 Knorr et al.
5,728,793 A   3/1998 Kumagai et al.

FOREIGN PATENT DOCUMENTS

| EP | 0 553 809 A1 | 8/1993 |
| EP | 0 829 491 A2 | 3/1998 |
| GB | 2 284 425 A | 6/1995 |
| JP | 7-126308 A | 5/1995 |

* cited by examiner

Primary Examiner—Fred M Teskin
(74) Attorney, Agent, or Firm—Sughrue Mion, PLLC

(57) ABSTRACT

The present invention provides a process for stopping continuous polymerization in which a raw material monomer is polymerized in a reaction vessel by continuously feeding the raw material monomer and a polymerization initiator in the reaction vessel, which process comprises the steps of, in the midst of the polymerization reaction, stopping feeding of the polymerization initiator to the reaction vessel with keeping stirring in the reaction vessel; and adjusting a feed flow rate of the raw material monomer to the reaction vessel so that a temperature $T_1$ (° C.) in the reaction vessel and a temperature $T_2$ (° C.) of an external wall thereof satisfy a relation represented by the formula:

$$T_2-20 \leq T_1 \leq T_2+20.$$

4 Claims, 1 Drawing Sheet

PROCESS FOR STOPPING CONTINUOUS POLYMERIZATION

BACKGROUND OF THE INVENTION

1. Field of the Invention

The present invention relates to a process for stopping continuous polymerization whereby the proceeding of polymerization reaction can be stopped in a short time and be resumed in a short time in the continuous polymerization of methacrylic acid ester polymers and the like.

2. Description of the Related Art

There have been recently adopted continuous bulk polymerization processes or continuous solution polymerization processes in which raw material monomers, a polymerization initiator and the like are continuously added to a polymerization reaction vessel for production of methacrylic acid ester polymers, acrylic acid ester polymers, a polystyrene, an acrylonitrile-butadiene-styrene resin (ABS) or the like.

A production of methacrylic acid ester polymers such as a polymethyl methacrylate (PMMA) by the continuous bulk polymerization process in which methacrylic acid ester-based monomers such as methyl methacrylate (MMA) and a polymerization initiator are continuously fed in a polymerization reaction vessel is described in U.S. Pat. No. 5,728,793.

When the polymerization reaction of MMA and the like is carried out by the continuous bulk polymerization process, PMMA, a reaction product, is taken out from a reaction vessel as viscous polymerization liquid (hereinafter referred to as "polymerization syrup"), then introduced into, for example, a degas extruder to separate and remove unreacted monomers and further pelletized, for example, by a pelletizer, and provided as a raw material of various PMMA products.

At production of the above-mentioned PMMA, when trouble is happened at a degas extruder or a pelletizer which are disposed at the downstream side of a polymerization syrup flow from the reaction vessel, or when inspection and the like are carried out at the above-mentioned downstream side, it is required to stop the influx of polymerization syrup to the downstream side.

As a method of stopping the influx of polymerization syrup to the downstream side, there are methods of flowing polymerization syrup into a storage tank capable of storing polymerization syrup and of stopping polymerization reaction at the upstream side.

Since the period capable of stopping the polymerization reaction is dependent on the volume of a storage tank in the former method, the storage tank with a large volume are required for an adequate time for inspection, repair and the like, and it is technically very difficult to preserve the polymerization syrup with preventing polymerization in the storage tank. Further, the polymerization syrup collected in the storage tank also may not be reused due to thermal polymerization and the like at storage.

On the other hand, in the process of stopping polymerization reaction at the upstream side, usually, the feed of a polymerization initiator to a polymerization vessel is stopped and the polymerization inhibitor together with an MMA monomer is fed to substitute the inside of the reaction vessel with the MMA monomer containing the polymerization inhibitor. Consequently, a significant time is necessary for stopping the polymerization reaction through the above procedure, and the influx of much polymerization syrup to the downstream side cannot be immediately stopped when it is necessary. Further, when resuming the polymerization reaction, a substitution of the MMA monomer containing the polymerization inhibitor with a MMA monomer containing a polymerization initiator is required and, a significant time is required for resumption of the polymerization reaction.

SUMMARY OF THE INVENTION

It is an object of the present invention to provide a process for stopping continuous polymerization whereby the proceeding of polymerization reaction can be stopped in a short time and be resumed in a short time in production of a polymer by the continuous polymerization.

In order to solve the above-mentioned problem, the present invention provides:

(1) a process for stopping continuous polymerization in which a raw material monomer is polymerized in a reaction vessel by continuously feeding the raw material monomer and a polymerization initiator in the reaction vessel, which process comprises the steps of, in the midst of the polymerization reaction, stopping feeding of the polymerization initiator to the reaction vessel with keeping stirring in the reaction vessel; and adjusting a feed flow rate of the raw material monomer to the reaction vessel so that a temperature $T_1$ (° C.) in the reaction vessel and a temperature $T_2$ (° C.) of an external wall thereof satisfy a relation represented by the formula:

$$T_2 - 20 \leq T_1 \leq T_2 + 20,$$

(2) the process for stopping continuous polymerization according to the afore-mentioned (1), wherein the temperature $T_1$ (° C.) is at a temperature of from 120 to 200° C., (3) the process for stopping continuous polymerization according to the afore-mentioned (1), wherein the raw material monomer is methyl methacrylate, and (4) the process for stopping continuous polymerization according to any one of the afore-mentioned (1) to (3), wherein the continuous polymerization is a continuous bulk polymerization.

Namely, the process for stopping the continuous polymerization of the present invention is characterized in that (i) with continuously carrying out the stirring treatment in a reaction vessel in like manner as before stopping of the feed of a polymerization initiator, (ii) the feed of a polymerization initiator in the above-mentioned reaction vessel is stopped, and (iii) the feed flow rate of the raw material monomer to the reaction vessel is adjusted so that a temperature $T_1$ (° C.) in the reaction vessel and a temperature $T_2$ (° C.) of an external wall of the reaction vessel satisfy a relation represented by the formula:

$$T_2 - 20 \leq T_1 \leq T_2 + 20.$$

According to the process, the proceeding of polymerization reaction can be stopped by removing heat quantity which is generated by stirring in the reaction vessel and the like without feeding a polymerization inhibitor in the reaction vessel, feeding a reduced amount of a raw material monomer so that the temperature in the reaction vessel keeps a predetermined temperature, and only extracting a polymerization syrup or a raw material monomer (hereinafter, these are collectively referred to as "Polymerization Syrup") whose amount is comparable to that of the fed raw material monomer, while further keeping the temperature in the reaction vessel high.

In the present invention, although a polymerization inhibitor is not necessarily fed in a reaction vessel for stopping the polymerization reaction, a polymerization inhibitor which has been added to the raw material monomer by several ppm for preventing the polymerization of the raw material monomer during its storage is usually fed in the reaction vessel with feeding the raw material monomer.

According to a conventional continuous polymerization, a raw material monomer and polymerization syrup existing in a reaction vessel have been substituted with a raw material monomer containing a polymerization inhibitor at stopping polymerization reaction, and after the polymerization reaction is stopped the feed of the raw material monomer to the reaction vessel and stirring in the reaction vessel have been stopped.

On the other hand, in the process for stopping continuous polymerization of the present invention, during stopping the polymerization reaction an amount of Polymerization Syrup extracted from the reaction vessel is reduced to the amount necessary for removing heat quantity which is generated by stirring in the reaction vessel and the like. Further, since a polymerization initiator is not fed in the reaction vessel as shown in the above-mentioned (ii), the stirring in the reaction vessel is continuously carried out as shown in the above-mentioned (i) in order to prevent from locally changing temperature, proceeding excessive polymerization reaction by the temperature change, increasing pressure in the reaction vessel and the like. Further, in the present invention, as shown in the above-mentioned (iii), the feed of the raw material monomer in the reaction vessel is adjusted and the Polymerization Syrup is extracted from the reaction vessel so that heat quantity which is generated by stirring in the reaction vessel and the like is removed and the temperature in the reaction vessel keeps a predetermined temperature; therefore, the excessive rise of the temperature in the reaction vessel to proceed thermal polymerization reaction can be prevented. Further, in the present invention, for example, since abruptly cooling the inside of the reaction vessel by a jacket surrounding the outer wall of the reaction vessel is not carried out, the excessive polymerization reaction by gelation effect can be prevented.

Further, in the process for stopping continuous polymerization of the present invention, when the temperature in the reaction vessel is at a temperature of from 120 to 200° C., the inside of the reaction vessel is kept at a comparatively high temperature; therefore, the resumption of the polymerization reaction can be carried out further immediately.

Further, the process for stopping continuous polymerization of the present invention is preferable for continuous bulk polymerization of methyl methacrylate as a raw material monomer.

According to the process for stopping continuous polymerization of the present invention, the stoppage and resumption of the polymerization reaction can be smoothly carried out while suppressing the consumption of a raw material monomer and thermal energy. Consequently, according to the process for stopping continuous polymerization of the present invention, the polymerization reaction can be stopped even for a comparatively short time such as several ten minutes to about several hours and even for a long time such as one day to several days.

DETAILED DESCRIPTION OF THE INVENTION

Figure 1:
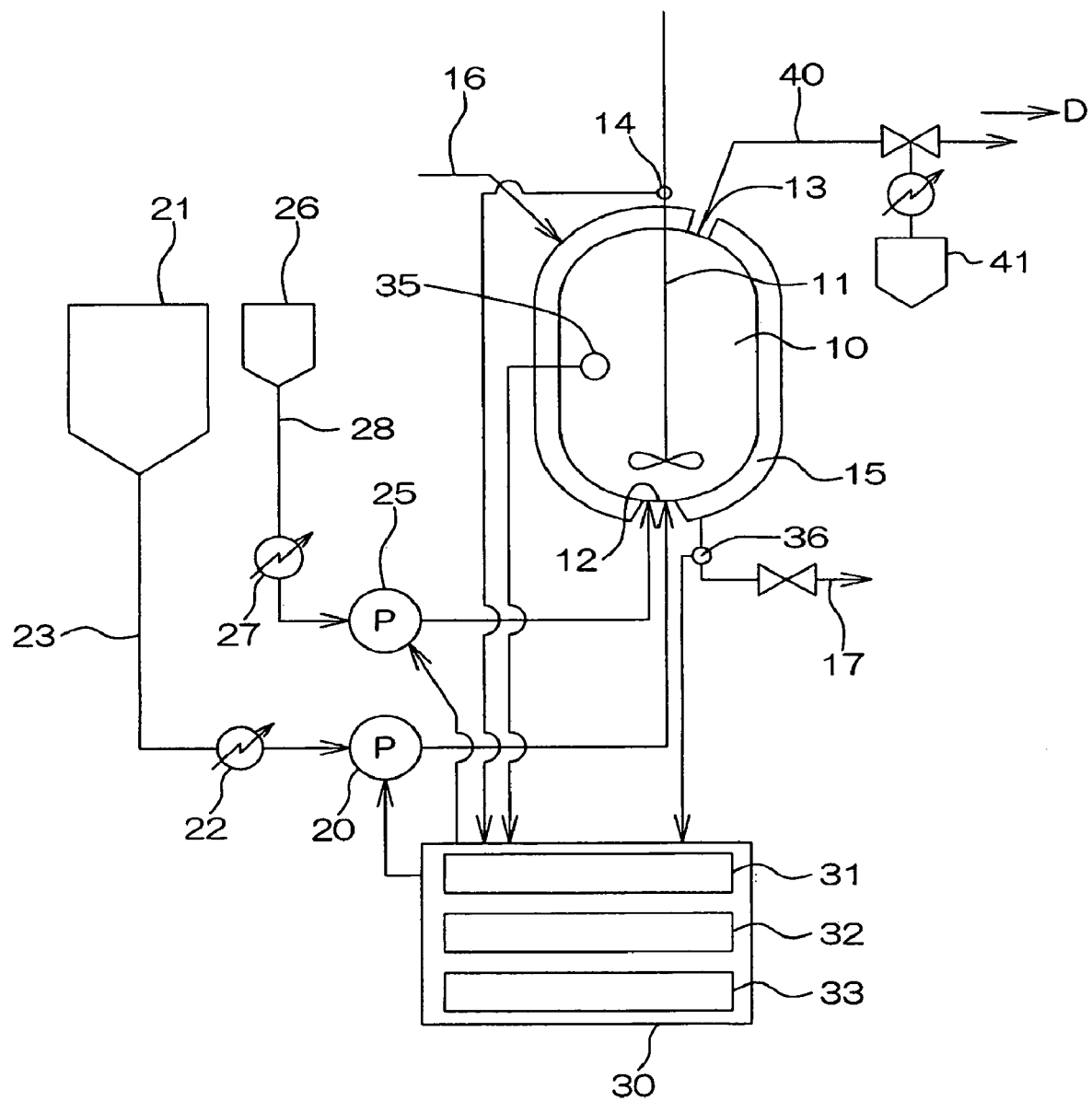
FIG. 1 is a block diagram showing one embodiment of the present invention.

The continuous polymerization in the present invention includes continuous bulk polymerization and continuous solution polymerization.

In the present invention, the raw material monomer includes a methacrylic acid ester monomer, an acrylic acid ester monomer, styrene, acrylonitrile and the like. These monomers may be used alone or two or more may be used in combination thereof. Further, rubber polymers such as polybutadiene and SBR can be also used with dissolution.

Here, the continuous bulk polymerization using a methacrylic acid ester monomer as a raw material monomer is illustrated below as an example but it is not limited thereto.

The methacrylic acid ester monomer being the raw material monomer is not specifically limited, but examples include an alkyl methacrylate, an aryl methacrylate and the like. Among these, an alkyl methacrylate is preferabe.

The alkyl in the above-mentioned alkyl methacrylate is not specifically limited, but examples include alkyl having 1 to 18 carbons. Namely, the specific examples of the alkyl methacrylate include methyl methacrylate, ethyl methacrylate, n-propyl methacrylate, isopropyl methacrylate, n-butyl methacrylate, isobutyl methacrylate, sec-butyl methacrylate, tert-butyl methacrylate, n-hexyl methacrylate, n-octyl methacrylate, lauryl methacrylate, stearyl methacrylate and the like. Among these, methyl methacrylate is preferabe.

The methacrylic acid ester monomer of the above-mentioned exemplification may be used alone or two or more may be used in combination thereof.

Further, the methacrylic acid ester monomer of the above-mentioned exemplification alone may form a methacrylic acid ester-based polymer or may form a copolymer containing other copolymerizable vinyl monomer in a proportion of 20% by weight or less.

Examples of the above-mentioned copolymerizable vinyl monomer include acrylic acid esters such as methyl acrylate, ethyl acrylate, propyl acrylate, butyl acrylate and 2-ethylhexyl acrylate; unsaturated carboxylic acids or acid anhydrides such as acrylic acid, methacrylic acid, maleic acid, itaconic acid, maleic anhydride and itaconic anhydride; hydroxyl group-containing monomers such as 2-hydroxyethyl acrylate, 2-hydroxypropyl acrylate, monoglycerol acrylate, 2-hydroxyethyl methacrylate, hydroxypropyl methacrylate and monoglycerol methacrylate; nitrogen-containing monomers such as acrylamide, methacrylamide, acrylonitrile, methacrylonitrile, diacetone acrylamide and dimethylaminoethyl methacrylate; epoxy group-containing monomers such as allyl glycidyl ether, glycidyl acrylate and glycidyl methacrylate; styrene-based monomers such as styrene and α-methyl styrene, etc.

In the present invention, the polymerization initiator is selected in accordance with a polymer being an objective or a kind of the raw material monomer used for polymerization reaction and is not specifically limited, but for example, radical initiators are mentioned.

Examples of the above-mentioned radical initiator include azo compounds such as azobisisobutyronitrile, azobisdimethylvaleronitrile, azobiscyclohexanenitrile, 1,1'-azobis(1-acetoxy-1-phenylethane), dimethyl 2,2'-azobisisobutyrate and 4,4'-azobis-4-cyanovaleric acid; organic peroxides such as benzoyl peroxide, lauroylperoxide, acetylperoxide, caproyl peroxide, 2,4-dichlorobenzoylperoxide, isobutylperoxide, acetylcyclohexylsulfonylperoxide, t-butylperoxypivalate, t-butylperoxy-2-ethyl hexanoate, 1,1-di-t-butylperoxycyclohexane, 1,1-di-t-butylperoxy-3,3,5-trimethylcyclohexane, 1,1-di-t-hexylperoxy-3,3,5-trimethylcyclohexane, isopropylperoxydicarbonate, isopropylperoxydicarbonate, isobutylperoxydicarbonate, s-butylperoxydicarbonate, n-butylperoxydicarbonate, 2-ethylhexylperoxydicarbonate, bis(4-t-butylcyclohexyl)peroxydicarbonate, t-amylperoxy-2-ethyl hexanoate, 1,1,3,3-tetramethylbutylperoxyethyl hexanoate, 1,1,2-trimethylpropylperoxy-2-ethyl hexanoate, t-butylperoxyisopropyl monocarbonate, t-amylperoxyisopropyl monocarbonate, t-butylperoxy-2-ethylhexyl carbonate, t-butylperoxyallyl carbonate, t-butylperoxyisopropyl carbonate, 1,1,3,3-tetramethylbutylperoxyisopropyl; monocarbonate, 1,1,2-triamethylpropylperoxyisopropyl monocarbonate, 1,1,3,3-tetramethylbutylperoxyisononate, 1,1,2-trimethylpropylperoxyisononate and tert-butylperoxybenzoate. These polymerization initiators may be used alone or two or more may be used in combination.

The compounding amount of the radical initiator is not specifically limited, but is usually 0.001 to 1% by weight based on the raw material monomer.

The radical polymerization initiators are not specifically limited, but are preferably compounds whose half-life time at the polymerization temperature is one minute or less. When the half-lifetime at polymerization temperature is too long, the reaction speed is slow; therefore, there is fear that it is not suitable for polymerization reaction by the continuous bulk polymerization.

In the present invention, a chain transfer agent may be used for adjusting the molecular weight of a polymer to be prepared.

The above-mentioned chain transfer agent may be either a mono-functional chain transfer agent or a poly-functional chain transfer agent, and specific examples include alkyl mercaptans such as propylmercaptan, butylmercaptan, hexylmercaptane, octylmercaptane, 2-ethylhexylmercaptan and dodecylmercaptan; aromatic mercaptans such as phenylmercaptan and thiocresol; mercaptans having 18 or less of carbon atoms such as ethylene thioglycol; polyhydric alcohols such as ethylene glycol, neopentyl glycol, trimethylolpropane, pentaerythritol, dipentaerythritol, tripentaerythritol and sorbitol; compounds whose hydroxyl group is esterified with thioglycolic acid or 3-mercaptopropionic acid; 1,4-dihydronaphthalene; 1,4,5,8-tetrahydronaphthalene; β-terpinen; terpinolene; 1,4-cyclohexadiene; hydrogen sulfide and the like. These may be used alone or two or more may be used in combination.

Since an amount of the chain transfer agent differs depending on the kind of the chain transfer agent to be used, it is not specifically limited, but, for example, when mercaptans are used, it is preferably 0.01 to 3 parts by weight based on 100 parts by weight of the raw material monomer and more preferably 0.05 to 1 part by weight.

Then, illustration is carried out referring to a continuous bulk polymerization device shown in FIG. 1.

The continuous bulk polymerization device shown in FIG. 1 is equipped with;

a reaction vessel 10, a stirring blade 11 for stirring contents in the reaction vessel 10, rotational number detection means 14 for detecting the rotational number of the stirring blade 11, monomer feed means (specifically, a monomer feed pump 20) for feeding the raw material monomer to the reaction vessel 10, initiator feed means (specifically, an initiator feed pump 25) for feeding a polymerization initiator to the reaction vessel 10, temperature detection means (specifically, a temperature sensor 35) for detecting temperature in the reaction vessel 10, a temperature adjustment means (specifically, a jacket 15) for adjusting temperature of the external wall of the reaction vessel 10, initiator feed flow rate control means 32 for controlling the flow rate of the polymerization initiator fed to the reaction vessel 10 and for stopping the feed of an initiator by the initiator feed means (the initiator feed pump 25) when stopping the polymerization reaction caused by a trouble at the downstream side D of the reaction vessel, monomer feed flow rate control means 31 for controlling the flow rate of the raw material monomer fed to the reaction vessel 10 and for controlling the feed flow rate of the raw material monomer by the monomer feed means (the monomer feed pump 20) to keep the temperature in the reaction vessel 10 at a predetermined temperature when the polymerization reaction is stopped because trouble is generated at the downstream side D of the reaction vessel, and temperature adjustment and control means 33 for adjusting the setting temperature of the temperature adjustment means (the jacket 15).

In the continuous bulk polymerization device shown in FIG. 1, the reaction vessel 10 is not specifically limited, but preferably is a perfect mixing type reaction vessel which can form substantially perfect mixing condition in the reaction vessel.

The stirring blade 11 for stirring contents in the reaction vessel 10 is not specifically limited, but examples include a MIG blade, a MAX BLEND blade (a trade mark; manufactured by Sumitomo Heavy Industries Ltd.), a paddle blade, a double helical blade, a Full Zone blade (manufactured by Shinko Pantec Co., Ltd.) and the like. It is desirable to install baffles in the reaction vessel in order to improve stirring effect in the reaction vessel.

The higher the stirring efficiency of the stirring blade 11 is, the more preferable it is. However when stirring motive energy is larger than necessity, it is not preferable because by carrying out stirring operation excessive heat quantity is added to reaction solution. The stirring motive energy is not specifically limited, but preferably is 0.5 to 20 kW/m$^3$ and more preferably is 1 to 15 kW/m$^3$. The higher the viscosity of the reaction system is (or the higher the polymer content in the reaction system), the larger the stirring motive energy is preferably set to be.

As described above, since the stirring of the contents in the reaction vessel is continuously carried out during the stoppage of polymerization reaction in the present invention, the raw material monomer is fed in the reaction vessel so that heat quantity generated by stirring in the reaction vessel and the like is removed and temperature in the reaction vessel keeps a predetermined temperature, and the Polymerization Syrup in accordance with the feed are extracted from the reaction vessel.

The stirring blade 11 is equipped with the rotational number detection means 14 for adjusting its rotational number.

The rotational number is nearly same both in the polymerization reaction and in the stoppage of polymerization usually and kept at constant.

The state in the reaction vessel 10 during the polymerization reaction is not specifically limited, but state in which gas phase is not substantially included (hereinafter, the state is referred to as "full liquid state") is preferable. Problems that gels adhere and grow on the inner wall face of the reaction vessel 10 or that the quality of a polymer is lowered by mixing of the gels can be prevented from occurring, by forming the full liquid state in the reaction vessel 10. Further, when the full liquid state is formed in the reaction vessel 10, the whole volume of the reaction vessel 10 can be effectively utilized for preparation of the polymer; therefore, the production efficiency of the polymer can be improved.

With respect to a method for attaining the full liquid state in the reaction vessel 10, the most convenient method includes a method of arranging a discharge outlet 13 for extracting the polymerization syrup out of the reaction system at the uppermost portion of the reaction vessel 10. Further, the pressure in the reaction vessel 10 is adjusted so as to be pressure which is the vapor pressure or more of the raw material monomer at the temperature in the reaction vessel in order not to generate the gas of the raw material monomer in the reaction vessel 10. The pressure is usually about 10 to 20 kg/cm$^2$.

Further, it is preferable that the state in the reaction vessel 10 is an adiabatic state in which the incomings and outgoings of heat does not substantially occur from the external portion of the reaction vessel. In order to let the state in the reaction vessel 10 be an adiabatic state, a temperature in the reaction vessel may be set at nearly equal temperature to that of the external wall, and as a specific means for obtaining the adiabatic state, for example, as described later, temperature adjustment means such as a jacket 15 which can adjust temperature surrounding the external wall of the reaction vessel 10 is mentioned.

Problems that gels adhere and grow on the inner wall face of the reaction vessel 10 or that the quality of a polymer is lowered by mixing of the gels can be prevented from occurring by forming the full liquid state in the reaction vessel 10. Further, by forming the full liquid state in the reaction vessel 10, the polymerization reaction can be stabilized and self controllability for suppressing the excessive reaction can be imparted. However, it is not preferable that the temperature of the external wall of the reaction vessel is set as too high in comparison with temperature in the reaction vessel, because excessive heat is added in the reaction vessel. The less the temperature difference between the inside of the reaction vessel and the external wall of the reaction vessel is, the more preferable it is, and specifically, it is preferable to adjust the temperature within a fluctuation width of about ±5° C. at the stationary state of the polymerization reaction.

At the polymerization reaction, polymerization heat and stirring heat which are generated in the reaction vessel 10 are usually removed when Polymerization Syrup are extracted. The heat quantity which the Polymerization Syrup remove is determined by the flow rate of the Polymerization Syrup, specific heat and the temperature of the polymerization reaction.

The temperature in the reaction vessel 10 at the polymerization reaction is fluctuated in accordance with various conditions until being stationary state and is not specifically limited, but is usually set at about 120 to 200° C. and preferably about 130 to 170° C. When the temperature is extremely high, for example, the syndiotacticity of a polymer obtained is lowered and the preparation amount of an oligomer is increased; as a result, fear of lowering the heat resistance property of a resin is generated.

The average residential time of a raw material monomer in the reaction vessel 10 is not specifically limited, but is usually 15 minutes to 6 hours, preferably 15 minutes to 3 hours and more preferably 20 minutes to 1.5 hours. When the residential time of the raw material monomer is elongated beyond necessity, the preparation amount of oligomers such as a dimer and a trimer becomes much and there is fear that the heat resistance property of the polymer (methacrylic acid ester-based polymer) which is a reaction product is lowered. The above-mentioned average residential time can be suitably adjusted by changing the feed flow rate of the raw material monomer per a unit time.

As the monomer feed means, for example, the monomer feed pump 20 for introducing the raw material monomer from a feed inlet 12 to the reaction vessel 10 is mentioned.

The monomer feed pump 20 is not specifically limited, but is preferably a pump which can set the feed flow rate of the raw material monomer into the reaction vessel 10 at a predetermined amount. Specifically, multiple-barreled reciprocal pumps such as a double-barreled pump, a triple-barreled pump and a quintuple-barreled pump are preferably mentioned, and non pulsation metering pumps such as a double-barreled non pulsation metering pump, a triple-barreled non pulsation metering pump and a quintuple-barreled non pulsation metering pump are more preferably mentioned.

The feed flow rate of the raw material monomer by the monomer feed pump 20 can be controlled by a monomer feed flow rate control means 31 in a control portion 30 described later and can be suitably adjusted when the residential time of the polymerization syrup in the reaction vessel 10 is to be changed. Further, during the stoppage of the polymerization reaction, the feed flow rate of the raw material monomer can be adjusted so that heat quantity which are generated by the actuation of the stirring blade 11 is removed and the temperature in the reaction vessel keeps a predetermined temperature.

As shown in FIG. 1, a monomer feed tank 21 storing the raw material monomer is connected with the feed orifice 12 of the reaction vessel 10 through a monomer feed channel (pipe) 23. The monomer feed pump 20 is situated at a downstream side from the monomer feed tank 21 when the monomer feed tank 21 is seen at an upstream side and the above-mentioned feed orifice 12 is seen at a downstream side, and is arranged on the above-mentioned monomer feed channel 23. Further, a heating and cooling device 22 for heating or cooling the raw material monomer fed in the reaction vessel 10 to appropriate temperature is further arranged at the upstream side.

The temperature of the raw material monomer fed to the reaction vessel 10 is not specifically limited, but since it may be a factor which collapses thermal balance in the reaction vessel and fluctuates polymerization temperature, it is preferable to appropriately adjust the temperature by the heating and cooling device 22. On the other hand, in case, during the stoppage of the poltmerization reaction, the feed flow rate of the raw material monomer is adjusted so that heat quantity which is generated by the actuation of the stirring blade 11 is removed and the temperature in the reaction vessel keeps a predetermined temperature, a requisite feed flow rate is fluctuated depending on the temperature of the raw material monomer fed; therefore, the temperature of the raw material monomer can be respectively set low or high, for example, in order to intentionally decrease or increase the feed flow rate of the raw material monomer.

As the initiator feed means, for example, the initiator feed pump 25 for introducing a polymerization initiator from the feed orifice 12 into the reaction vessel 10 is mentioned.

The initiator feed pump 25 is not specifically limited, but is preferably a pump which can set the feed flow rate of the polymerization initiator into the reaction vessel 10 at a predetermined amount. Specifically, like the above-mentioned monomer feed pump 20 a multiple-barreled reciprocal pump is preferably mentioned and a non pulsation metering pump is more preferably mentioned.

The feed flow rate of the polymerization initiator by the initiator feed pump 25 can be controlled by the initiator feed flow rate control means 32 in the control portion 30 described later. When the polymerization reaction is to be stopped, or when the temperature in the reaction vessel 10 is to be adjusted and the like, it can be suitably adjusted. Further, when the polymerization reaction is to be stopped, the feed of the polymerization initiator is stopped by the initiator feed flow rate control means 32.

As shown in FIG. 1, an initiator feed tank 26 storing the polymerization initiator (or the raw material monomer containing a polymerization initiator; hereinafter occasionally referred to as "Polymerization Initiator" collectively) is connected with the feed orifice 12 of the reaction vessel 10 through an initiator feed channel (pipe) 28. The initiator feed pump 25 is situated at a downstream side from the initiator feed tank 26 when the initiator feed tank 26 is seen at an upstream side and the above-mentioned feed orifice 12 is seen at a downstream side, and is arranged on the above-mentioned initiator feed channel 28. Further, a heating and cooling device 27 for heating or cooling the Polymerization Initiator fed in the reaction vessel 10 to appropriate temperature is further arranged at the upstream side.

Those which are stored in the above-mentioned initiator feed tank 26 and fed into the reaction vessel 10 by the initiator feed means may not be a polymerization initiator alone but may be the raw material monomer containing the polymerization initiator (or further containing other components such as a chain transfer agent). For example, when the polymerization initiator alone is fed into the reaction vessel 10 by the initiator feed means, there is fear that the polymerization reaction proceeds locally in the reaction vessel 10 depending on condition at feed, but such a problem can be solved by feeding those preliminarily prepared mixture of the polymerization initiator and the raw material monomer into the reaction vessel 10 by the initiator feed means.

The temperature of the Polymerization Initiator and the like fed into the reaction vessel 10 is not specifically limited, but since it may be a factor which collapses heat balance in the reaction vessel and fluctuates polymerization temperature it is preferable to suitably adjust the temperature by the heating and cooling device 27.

As a temperature detection means for detecting the temperature in the reaction vessel, for example, a temperature sensor 35 is mentioned. Examples of the temperature sensor 35 include a temperature sensor which is situated in the inside of the reaction vessel 10 and can directly detect the temperature of the reaction system stored in the reaction vessel 10, and the like, but the situated position of the temperature sensor and its detection method are not limited thereto.

The temperature in the reaction vessel 10 detected by the above-mentioned temperature detection means (the temperature sensor 35) is transmitted to the control portion 30 described later and becomes data for judging the necessity of controlling feed flow rate by the monomer feed means or the initiator feed means.

As the temperature adjustment means for adjusting the temperature of the external wall of the reaction vessel, for example, a jacket covering the external wall of the reaction vessel, a heater situated in the reaction vessel and the like are mentioned. Among these, a jacket covering the external wall of the reaction vessel is preferably mentioned from the viewpoint of letting the inside of the reaction vessel be adiabatic state and a jacket 15 covering the nearly whole external wall of the reaction vessel 10 is more preferably mentioned.

The jacket 15 shown in FIG. 1 heats or keeps the temperature in the reaction vessel 10 by introducing heating medium such as steam, hot water and organic heating medium from a heating medium feed channel 16. The temperature of the jacket 15 can be suitably adjusted by the temperature or pressure of the heating medium fed. The heating medium introduced into the jacket 15 is removed from a heating medium discharge channel 17. Further, the temperature and pressure of the jacket 15 are detected by a sensor such as a temperature sensor 36 located on the heating medium discharge channel 17. The located positions of the sensor such as the temperature sensor 36 are not specifically limited, but for example, may be on a heating medium feed channel 16 or in the jacket 15.

The polymerization reaction in the reaction vessel 10 is preferably carried out with keeping at a nearly constant temperature from the viewpoint of making the quality of a polymer prepared be constant. Accordingly, the temperature adjustment means (the jacket 15) is preferably controlled at a predetermined constant temperature so that the temperature in the reaction vessel 10 can be kept nearly constant.

The setting temperature of the above-mentioned temperature adjustment means (the jacket 15) is transmitted to the control portion 30 described later and becomes data for judging the necessity of controlling feed flow rate by the monomer feed means or the initiator feed means. When the above-mentioned temperature adjustment means is the jacket 15, the setting temperature of the temperature adjustment means can be adjusted by controlling the above-mentioned temperature or pressure of heating medium by the temperature adjustment and control means 33 described later.

Examples of the control portion 30 which is a control means of controlling the feed flow rates of the raw material monomer and the Polymerization Initiator include a control portion equipped with CPU, ROM, RAM and the like.

The ROM of the control portion 30 is a device for storing a program for controlling the monomer feed pump 20 by the monomer feed flow rate control means 31 and for storing a program for controlling the initiator feed pump 25 by the initiator feed flow rate control means 32, and the RAM of the control portion 30 is a device which temporarily stores temperature data in the reaction vessel 10 detected by the temperature sensor 35, the data of setting temperature of the jacket 15 and the data of the rotational number of the stirring blade 11 detected by rotational number detection means 14 in order to perform the above-mentioned program.

The CPU of the control portion 30 performs the program stored in the above-mentioned ROM based on the data stored in the above-mentioned RAM and controls the feed flow rate of the raw material monomer and/or the Polymerization Initiator into the reaction vessel 10 by the monomer feed means (the monomer feed pump 20) and/or the initiator feed means (the initiator feed pump 25).

One example of the controls by the monomer feed flow rate control means 31, the initiator feed flow rate control means 32 and the temperature adjustment and control means 33 in the control portion 30 is shown below.

When the polymerization reaction is to be stopped by a trouble generated at the downstream side D of the reaction vessel 10 or inspection and the like, the feed of a Polymerization Initiator into the reaction vessel 10 is stopped by performing the program in the above-mentioned ROM by the above-mentioned CPU and by controlling the initiator feed pump 25 which is the initiator feed means, with using the initiator feed flow rate control means 32.

When the polymerization reaction is stopped, the feed flow rate of the raw material monomer is suitably adjusted by controlling the monomer feed pump 20 which is the monomer feed means, using the monomer feed flow rate control means 31 so that heat quantity generated by stirring is removed, and a temperature $T_1$ (° C.) in the reaction vessel 10 and the temperature $T_2$ (° C.) of an external wall of the reaction vessel 10 satisfy the relation represented by the formula:

$$T_2 - 20 \leq T_1 \leq T_2 + 20,$$

or preferably the formula:

$$T_2-5 \leq T_1 \leq T_2+5.$$

Further, the temperature $T_1$ (° C.) is usually at a temperature of from 120 to 200° C.

Further, the temperature $T_2$ (° C.) of the external wall of the reaction vessel 10 is controlled at a predetermined constant temperature by adjusting the temperature and pressure of the heating medium in the jacket 15 using the temperature adjustment and control means 33, but in case the fluctuation of the temperature $T_1$ (° C.) is great, the temperature $T_2$ (° C.) of the external wall can be changed using the temperature adjustment and control means 33.

The feed flow rate of the raw material monomer at stoppage of the polymerization reaction is changed in accordance with the above-mentioned heat quantity and the temperature of the raw material monomer fed, and it is usually about 1/100 to 1/25 of the feed flow rate of the raw material monomer which is fed during the polymerization reaction.

Further, when the feed of the Polymerization Initiator is stopped for stoppage of the polymerization reaction, the feed of the raw material monomer through an initiator feed line may be carried out in order to prevent the polymerization initiator from staying in the initiator feed line (this channel is not shown in FIG. 1).

Although the feed flow rate of the raw material monomer is greatly reduced at stoppage of the polymerization reaction as mentioned above, the feed of the raw material monomer to the reaction vessel 10 is successively carried out; therefore Polymerization Syrup with an amount comparable to the feed flow rate are required to be extracted from the reaction vessel 10.

The Polymerization Syrup discharged at stoppage of the polymerization reaction are extracted from, for example, the discharge outlet 13 of the reaction vessel 10 in like manner as a conventional treatment method against the polymerization syrup which is prepared during the polymerization reaction and is transferred and collected through a polymerization syrup derivation channel 40.

Since an unreacted raw material monomer is contained in either of the Polymerization Syrup discharged during stoppage of the polymerization reaction and the polymerization syrup discharged during the polymerization reaction, treatment for evaporating and separating volatile portions in which the unreacted raw material monomer is a main component is carried out, if necessary.

As the transfer method of the above-mentioned polymerization syrup and Polymerization Syrup, a method described in Japanese Examined Patent Publication No. 4-48802 is preferable. Further, as a method of evaporating and separating the above-mentioned volatile portions, a method using a degas extruder is known and, for example, methods described in Japanese Examined Patent Publication No. 51-29914 and No. 52-17555, Japanese Patent Application Laid-open No. 1-53682, No. 62-89719 and No. 3-49925 and the like are preferable.

When the reaction vessel used in the present invention is a perfect mixing type reaction vessel, a polymerization rate at which a monomer is converted to a polymer in the reaction vessel is generally equivalent to a polymer content rate in the polymerization syrup. In the present invention, the polymerization rate is not specifically limited, but is usually set at 40 to 70% by weight. The higher the polymerization rate is, the higher the productivity of a polymer is; however, the viscosity of the reaction system is heightened and great stirring motive energy is required. Further, the lower the polymerization rate, the lower the productivity; therefore load for collecting an unreacted raw material monomer is enlarged.

In the present invention, the raw material monomer separated and collected from the polymerization syrup is stored in a monomer collection tank 41 and if necessary, fed again to the monomer feed tank 21 to be able to be provided for the polymerization reaction. Further, the raw material monomer collected is not limited thereto, but it is preferable that a polymerization inhibitor (for example, "TOPANOL A" and the like) is let exist at a proportion of 2 to 8 ppm, the oxygen concentration of a gas phase portion is set at 2 to 8% by volume and further, the monomer is stored in cooled state, specifically, at a low temperature of, for example, about 0 to 5° C. so that the polymerization reaction does not proceed during stored in a monomer collection tank 36 or the monomer feed tank 21. It can be stored for a long term by being stored thus, while preventing the polymerization reaction of the unreacted monomer collected.

When the continuous polymerization of the present invention is continuous solution polymerization, a solvent is used for the polymerization reaction; in this case, a continuous polymerization device is further equipped with a tank for feeding a solvent, a feeding channel and a pump (feed means).

The tank for feeding a solvent, feeding channel and pump (feed means) are not specifically limited and those similar as those conventionally used can be used. Further, the solvent may be fed into the reaction vessel after mixing the raw material monomer and/or the polymerization initiator with it, or may be directly fed into the reaction vessel. As the above-mentioned solvent, solvents described later are mentioned.

The continuous solution polymerization device is similar as the above-mentioned continuous bulk polymerization device except that a tank for feeding a solvent, a feeding channel, a pump (feed means) and the like are provided.

Further, the continuous solution polymerization process is similarly carried out in like manner as the above-mentioned continuous bulk polymerization process except that a solvent is used for the polymerization reaction. The solvent used for the polymerization reaction is a solvent suitably set in accordance with the raw material monomer and the like of the continuous solution polymerization reaction and is not specifically limited, but examples include toluene, xylene, ethylbenzene, methyl isobutyl ketone, methyl alcohol, ethyl alcohol, octane, decane, cyclohexane, decalin, butyl acetate, pentyl acetate and the like.

In the continuous solution polymerization of the present invention, a ratio C:D in which C (kg/h) is a feed flow rate of the raw material monomer, and D (kg/h) is a feed flow rate of the solvent, is not limited thereto, but for example, is preferably 70:30 to 95:5 and more preferably 80:20 to 90:10.

EXAMPLES

The polymerization of methyl methacrylate and its stoppage were carried out using the continuous bulk polymerization device shown in FIG. 1.

The reaction vessel 10 is equipped with a MIG blade (70 rpm) as the stirring blade 11 and the jacket 15 nearly covering the whole of the reaction vessel. A perfect mixing type reaction vessel (an inner volume of 4.7 m³) was used.

As the raw material monomer fed by a monomer feed means, a mixture containing 94.6% by weight of methyl methacrylate (MMA), 5.3% by weight of methyl acrylate (MA) and 0.08% by weight of a chain transfer agent (n-octylmercatan) was used.

As a raw material monomer fed by the monomer feed means, mixture containing 94.62% by weight of methyl-methacrylate (MMA), 5.30% by weight of methyl acrylate (MA) and 0.08% by weight of a chain transfer agent (n-octylmercaptan) was used.

A quintuple-barreled reciprocal pump was used for the monomer feed pump 20 and its feed flow rate was fixed at 9600 kg/h.

The temperature $T_2$ (° C.) of an external wall of the reaction vessel 10 was controlled at 175° C. using the temperature adjustment and control means 33.

Further, as a polymerization initiator fed by the polymerization initiator feed means, mixture containing 94.17% by weight of methyl methacrylate (MMA), 5.27% by weight of methyl acrylate (MA), 0.10% by weight of a chain transfer agent (n-octylmercatan) and 0.46% by weight of a polymerization initiator (1,1-di-t-butylperoxy-3,3,5-trimethylcyclohexane) was used.

A triple-barreled reciprocal pump was used for the initiator feed pump 25. Further, its feed flow rate was set at 500 kg/h at the start of polymerization and then, suitably fluctuated by changing the output value of the pump so that the temperature $T_1$ (° C.) in the reaction vessel kept at 175° C.

The polymerization was continuously carried out for about 10 days. Meanwhile, the temperature $T_1$ (° C.) in the reaction vessel was within a range of about 174.8 to 175.2° C.

Then, the polymerization was stopped as follows for inspection of facilities at the downstream side.

The feed of the polymerization initiator was stopped by controlling the initiator feed pump 25. On the other hand, the monomer feed flow rate was adjusted by changing the output value of the monomer feed pump 20 so that the temperature $T_1$ (° C.) in the reaction vessel kept at 175° C. The polymerization was stopped for about one day, but the temperature $T_1$ (° C.) in the reaction vessel was within a range of about 170 to 180° C. during the period. Further, the temperature $T_2$ (° C.) of an external wall of the reaction vessel 10 was controlled at 175° C. in like manner as at polymerization.

After inspection of facilities for about one day, a predetermined amount of the raw material monomer was fed in like manner as the above-description, and a mixture of the polymerization initiator was suitably fluctuated and fed by changing the output value of the pump so that the temperature $T_1$ (° C.) in the reaction vessel kept at 175° C., to carryout continuous polymerization. Gels were not mixed and a similar polymer as the polymer before stoppage of the polymerization was obtained.

A time required for treatment of stopping the polymerization was about 30 minutes and a time required for resuming the polymerization and attaining stationary state was attained was about 30 minutes. They were greatly shortened in comparison with a conventional process of adding a polymerization inhibitor (about 6 hours for stopping treatment and about 6 hours for resuming treatment).

The present invention is not limited to the above description but various design modifications can be carried out within a scope described in the claims for patent.

What is claimed is:

1. A process for stopping continuous polymerization in which a raw material monomer is polymerized while being stirred in a reaction vessel by continuously feeding the raw material monomer and a polymerization initiator in the reaction vessel, which process comprises the steps of, in the midst of the polymerization reaction, stopping feeding of the polymerization initiator to the reaction vessel with keeping stirring in the reaction vessel; and adjusting a feed flow rate of the raw material monomer to the reaction vessel so that a temperature $T_1$ (° C.) in the reaction vessel and a temperature $T_2$ (° C.) of an external wall thereof satisfy a relation represented by the formula:

$$T_2-20 \leq T_1 \leq T_2+20.$$

2. The process for stopping continuous polymerization according to claim 1, wherein the temperature $T_1$ (° C.) is at a temperature of from 120 to 200° C.

3. The process for stopping continuous polymerization according to claim 1, wherein the raw material monomer is methyl methacrylate.

4. The process for stopping continuous polymerization according to any one of claims 1 to 3, wherein the continuous polymerization is a continuous bulk polymerization.

* * * * *